United States Patent Office 2,809,959
Patented Oct. 15, 1957

2,809,959

PREPARATION OF HIGH-VISCOSITY SULFONATION PRODUCTS HAVING VISCOSITY STABILITY

Harold H. Roth, Bay City, Mich., assignor to The Dow Chemical Company, Midland, Mich., a corporation of Delaware No Drawing. Application November 24, 1954,
Serial No. 471,120

10 Claims. (Cl. 260—79.3)

This invention concerns a method of sulfonating vinyl aromatic hydrocarbon polymers to obtain readily, and in reproducible manner, sulfonated polymers having a desirable combination of properties. The method produces sulfonated polymers which are not truly soluble in water but which can be highly swollen by water and other aqueous liquids and which can be added in small proportions to such liquids to thicken, i. e., to increase the viscosity of, the liquids. The resulting thickened compositions are exceptionally stable against occurrence of extensive changes in the viscosity thereof on aging. They undergo less extensive changes in viscosity than do the liquids thickened with corresponding polymer sulfonates made in other ways.

The preparation of sulfonates of polymers of vinyl aromatic compounds such as styrene is already known. By known procedures there have been obtained sulfonated products which varied from those which were freely soluble in water but exerted no thickening action thereon, through materials which dissolved in water and caused thickening thereof, to materials which were insoluble in water. Many of the known procedures cannot be relied upon to give a desired product, but rather unpredictably produce widely different kinds of sulfonates, from one run to another, in consequence of small changes in operating procedure or conditions even when attempts are made rigorously to duplicate such procedures and conditions. In many cases, further difficulties are encountered when attempts are made to operate on larger scale, e. g., on a commercial scale. These difficulties appear to have been particularly acute when chlorosulfonic acid has been used as the sulfonation agent.

It has been taught that the mutual effect of water and sulfonated polystyrene-type resins on one another is at least in part determined by these factors:

(1) The degree of sulfonation, i. e., the average number of sulfonic acid groups per aromatic nucleus;
(2) The molecular weight and configuration of the polymeric starting material;
(3) The degree of crosslinking side reactions, e. g., the formation of sulfone crosslinkages, occurring during the sulfonation reaction; and
(4) The degree of chain scission reactions occurring during the sulfonation reaction.

If the degree of sulfonation is low, e. g., an average of less than about 0.5 sulfonic acid group per benzene nucleus of a polystyrene sulfonate, the polymer sulfonic acid tends to be insoluble in water. An average of more than 0.5, e. g. 0.7 or more, sulfonic acid group per benzene ring of sulfonated polystyrene resins appears to be necessary to confer water solubility on the polymer sulfonate. Low molecular weight polymer starting materials usually give sulfonates which are soluble in water and exert little thickening action thereon while high molecular weight starting polymers usually give sulfonates which cause a greater degree of thickening of water solutions. When the high molecular weight starting polymers are highly crosslinked polymers, the sulfonates are usually insoluble in water.

A complicating factor in the preparation of resin sulfonates having specific characteristics is the formation of crosslinkages such as sulfone crosslinkages during the sulfonation reaction. The formation of such crosslinkages between polymer molecules has several profound effects on the properties of the resulting sulfonated product, two of the more obvious of such effects being:

(1) The molecular weight of the sulfonate is greatly increased by such crosslinkages, and
(2) There are usually formed three-dimensional structures having gel-like characteristics.

While the increase in molecular weight by sulfone crosslinking increases the thickening power of the water-soluble sulfonates, the formation of three-dimensional structures, if carried to an excessive extent, tends to make insoluble products having no thickening effect on watery media. Moreover, the extremely great effects of sulfone crosslinking on the hydrophilic properties of the sulfonated products have made the preparation of products having specific properties very difficult to control from one run to another, particularly in large scale, e. g., commercial scale, operation.

An effect opposite to that of crisslinking appears in certain instances where chain scission or cleavage occurs during the sulfonation reaction, thereby further complicating the task of preparing specific products.

Methods have been proposed for sulfonating resinous polymers in which various attempts were made to reduce or to eliminate undesirable side reactions such as the crosslinking reaction. For this purpose, it has been proposed to sulfonate resinous polymers with sulfur trioxide, per se, or in the form of complexes with stable ethers, while having the reactants dissolved in very dilute proportion in large proportions of inert diluent solvents. Such methods have been advantageously employed for making water-soluble products having only slight, or very moderate, thickening power. However, it is difficult to prepare very high viscosity sulfonates without incurring crosslinking.

Another characteristic of many sulfonates which have been crosslinked during sulfonation and which have considerable thickening power on watery compositions is the characteristic of viscosity instability on aging. In other words, the viscosities of many aqueous compositions thickened with styrene-type resin sulfonates are not stable, but tend to decrease on standing, particularly when the aqueous compositions are aged at an elevated temperature. While such compositions are useful and can advantageously be employed in certain applications, such viscosity instability is often undesirable and disadvantageous.

It is an object of this invention to provide a method for the preparation of resin sulfonates which are highly swellable by water and by aqueous liquids, which resin sulfonates can be added in small proportions to such liquids to thicken, i. e., to increase the viscosity of, the liquids and to form thickened compositions characterized by exceptional stability against occurrence of changes in viscosity thereof on aging.

A particular object is to provide such a method for the preparation of resin sulfonates from polymers of styrene and ar-vinyltoluene.

A further object is to provide such a method whereby such resin sulfonates can be readily and reproducibly prepared.

Other objects and advantages of the invention are evident in the following description.

The objects of this invention are attained in a method of sulfonating certain polymers of monovinylaromatic hydrocarbons with chlorosulfonic acid in the presence of liquid sulfur dioxide as a reaction medium.

The polymers which are employed are polymeric resins containing, in chemically combined form, a predominate proportion, e. g. 60 or more percent by weight, of at least one monovinylaromatic hydrocarbon of the benzene series such as styrene and ar-vinyltoluene (o-vinyltoluene, m-vinyltoluene or p-vinyltoluene). The polymer can consist essentially of one such vinylaromatic hydrocarbon or can be a copolymer of two or more thereof. The polymerized vinylaromatic hydrocarbons can also contain, chemically combined therein, a minor proportion, e. g., up to about 40 percent by weight, of one or more other polymerizable monovinylidene compounds, excepting such monovinylidene compounds that contain ester groups. Examples of monovinylidene compounds suitable for use in copolymer starting materials are alphamethylstyrene, ar-chlorostyrenes, other styrene derivatives, acrylonitrile and methacrylonitrile. The polymers can also contain very small proportions of polyvinylidene compounds such as divinylbenzene chemically combined therein, provided that the polymer molecules are not appreciably crosslinked. The polymers must be soluble in usual polymer solvents such as toluene, dioxane or methyl ethyl ketone. The starting polymers must also have relatively high molecular weights, e. g. weight average molecular weights of about 300,000 or more. These molecular weights correspond to viscosities of 82.4 or more centipoises at a temperature of 25° C. for 10 percent by weight solutions of the polymers in toluene.

The invention is practiced by admixing a polymer of the kind just described with chlorosulfonic acid in the presence of liquid sulfur dioxide as a reaction medium at a reaction temperature below and up to about 10° C. usually between —40° and +10° C., preferably between —20° and +5° C. The reaction is conveniently carried out at about —10° C., the boiling point of sulfur dioxide at atmospheric pressure. The reaction can be carried out below or above atmospheric pressure.

The relative proportions of chlorosulfonic acid and of polymer starting material which are admixed are such as correspond to at least 0.7, preferably from 0.7 to 2, molecular proportions of chlorosulfonic acid for each molecular proportion of monomeric compounds chemically combined in the polymer, although the molecular ratio of chlorosulfonic acid to monomeric compounds in the polymer starting material can be as large as desired, e. g., ten or more.

The amount of liquid sulfur dioxide which is usually employed is such as corresponds to from 80 to 99, preferably from 90 to 99, percent by weight of the whole reaction mixture, i. e., so that the weight of the polymeric resin sulfonic acid product is from 1 to 20, preferably from 1 to 10, percent of the weight of the whole reaction mixture. It is necessary that liquid sulfur dioxide be employed as medium for the reaction in the practice of this invention. When other inert liquid media are employed, such as liquid chlorinated aliphatic hydrocarbons or mixtures thereof with liquid sulfur dioxide, the resin sulfonates obtained are not the equivalent of those obtainable by sulfonation in liquid sulfur dioxide as the reaction medium in accordance with this invention, particularly in regard to the stability on aging of aqueous compositions thickened with the resin sulfonates.

The chlorosulfonic acid and the polymer starting material are admixed by adding the polymer to a reaction mixture containing the chlorosulfonic acid, or by adding the polymer starting material and the chlorosulfonic acid concurrently to a mixing and reaction zone. The polymer starting material can be first dissolved or dispersed in at least a portion of the liquid sulfur dioxide and the resulting solution or dispersion be admixed with the chlorosulfonic acid reactant in the reaction zone. Alternatively, the polymer starting material in very finely divided form can be admixed directly with the reaction mixture. For this purpose, the polymer starting material preferably consists of extremely small particles having average diameters not greater than about 10 microns and aggregates of such particles, which aggregates are not more than about 15 microns in diameter. The homopolymers of styrene and of ar-vinyltoluene are not completely miscible with liquid sulfur dioxide. When a homopolymer is admixed with liquid sulfur dioxide, the polymer appears to imbibe sulfur dioxide and to form a viscous liquid layer which is not miscible with the liquid sulfur dioxide layer. Such homopolymers are preferably added directly to the sulfonation reaction mixture in the form of fine particles as described above. Copolymers of styrene and of ar-vinyltoluene can also be used in the form of fine powders, but certain such copolymers are readily dispersible in liquid sulfur dioxide and are preferably employed in the form of such dispersions. For example, copolymers of styrene and acrylonitrile or of ar-vinyltoluene and acrylonitrile, containing from about 2 to about 15 percent by weight acrylonitrile, readily disperse in liquid sulfur dioxide to form stable colloidal dispersions. Copolymers containing from about 15 to about 40 weight percent acrylonitrile appear to be soluble, i. e., to form clear, true or colloidal solutions, in liquid sulfur dioxide.

The polymer starting material is preferably added slowly to the reaction mixture with very vigorous agitation to insure thorough dilution and mixing of the reactants and to prevent the formation of lumps. It is usually desirable, particularly with sulfonations at lower temperatures, e. g. below 0° C., to continue the agitation for a time such as 15 to 30 minutes or more after the reactants are completely admixed in order to allow complete reaction before isolating the product.

The operations can be made continuous by feeding chlorosulfonic acid, the polymer starting material and liquid sulfur dioxide in desired proportions continuously to a mixing and reaction zone containing the resulting reaction mixture under the desired reaction conditions and continuously withdrawing a portion of that reaction mixture from the reaction zone.

The sulfonation of polymers as just described, results in formation of a suspension of swollen granules of polymeric resin sulfonate in a liquid medium. This suspension can be separated in usual ways, such as by filtering, centrifuging or decanting, and the solid can be washed with a fresh portion of the liquid sulfur dioxide or with an inert organic liquid such as a chlorinated aliphatic hydrocarbon or an ether such as diethyl ether. The resin sulfonic acid can then be dried in the usual manner, preferably out of contact with excess water vapor, usually under vacuum.

The sulfonated resin products so obtained are water-swellable acids which can be employed as such or converted into salts by reaction with alkalies such as ammonia, amines and alkali metal bases, e. g. sodium hydroxide and potassium hydroxide.

The resin sulfonates are highly swellable by watery media to form hydrous gels which exert a very great thickening action on the resulting aqueous compositions. Depending for the most part on the molecular weight of the starting polymer and on the extent of crosslinking of the sulfonate during sulfonation, the viscosities of aqueous compositions containing, for example, only 0.5 percent by weight of the neutral sodium salt of such resin sulfonates are from about 10,000 centipoises to about 70,000 centipoises or more at a temperature of 25° C. Correspondingly high viscosities are obtained in aqueous compositions of other cationic forms and concentrations of these resins. Such very high viscosities correspond to extremely high molecular weights in the order of several billions and indicate that considerable crosslinking has occurred during the sulfonation reaction. Yet, by the method hereinbefore described, the extensive crosslinking reaction during sulfonation is unexpectedly controllable to avoid the formation of insoluble products, to avoid chain scission and to produce water-swellable products having high thickening power on watery media.

A further, unanticipated and very important aspect of the present method is that the resin sulfonate products are capable of forming highly thickened watery compositions which have exceptional stability of viscosity. Many of the thickened aqueous compositions made from previously known sulfonates have not retained their initial viscosities upon aging, particularly when those compositions have been heated, but the viscosities of such compositions have tended to drift downwards. No completely acceptable hypothesis has yet been offered in explanation of this so-called "viscosity-drift." In contrast to such viscosity-unstable products, the products of the present invention are very stable, substantially retaining their thickening power even during boiling of their aqueous compositions.

Uses are known for sulfonates of the kind produced by the present method, such as in the preparation of dispersions, emulsions and pastes with watery vehicles. These sulfonates are particularly advantageous for obtaining high thickening of aqueous compositions with small proportions of added sulfonate and for obtaining thickened compositions having exceptionally good stability of viscosity.

The following examples illustrate the invention, but are not to be construed as limiting its scope.

In the examples, the following polymer starting materials were employed:

Polymer A was obtained by mass polymerization of a monomeric mixture of ar-vinyltoluene and acrylonitrile and contained 95 percent by weight ar-vinyltoluene and 5 percent acrylonitrile chemically combined therein. A solution of a portion of the polymer in 9 times its weight of toluene had a viscosity at 25° C. of 727 centipoises.

Polymer B was also a mass copolymer of 95 percent by weight ar-vinyltoluene and 5 percent acrylonitrile. A solution of a portion of the polymer in 9 times its weight of toluene had a viscosity at 25° C. of 82.4 centipoises.

Polymer C was obtained by polymerization of an aqueous dispersion of monomeric ar-vinyltoluene to form a stable aqueous dispersion of polymeric ar-vinyltoluene which was then spray-dried to obtain a dry, pulverulent solid resin. A solution of a portion of the polymer in 9 times its weight of toluene had a viscosity at 25° C. of 6600 centipoises.

Polymer D was a mass copolymer of 96 percent by weight styrene and 4 percent by weight acrylonitrile. A solution of a portion of the copolymer in nine times its weight of toluene had a viscosity of 136.6 centipoises at 25° C.

*Example 1*

Into a solution of 15.6 ccs. chlorosulfonic acid and 300 ccs. liquid sulfur dioxide at −10° C. was slowly added a dispersion of 25 grams polymer A, hereinbefore identified, in 300 ccs. liquid sulfur dioxide, the polymer dispersion being added slowly, over a period of 4 minutes, with very vigorous agitation of the reaction mixture. After complete addition of the polymer starting material, agitation was continued for 30 minutes after which the resulting slurry was filtered. The solid polymer sulfonic acid was washed with ether and dried in a vacuum.

A portion of the polymer sulfonic acid was dissolved in water, neutralized with sodium hydroxide and the solution was adjusted to a concentration of 0.5 percent by weight of the neutral sodium resin sulfonate. That solution had a viscosity at 25° C. of 70,000 centipoises. A portion of the solution was heated to, and held at, 90° C. for 19 hours. After the concentration was again adjusted to 0.5 percent by weight of the neutral sodium resin sulfonate, the viscosity at 25° C. was 70,000 centipoises.

*Example 2*

The procedure of Example 1 was substantially repeated except that the reaction mixture was filtered soon after the polymer addition was complete, without further agitation of the reaction mixture.

The viscosity at 25° C. of a water solution of 0.5 percent by weight neutral sodium salt of the polymer sulfonate was 33,000 centipoises. After 20 hours at a temperature of 90° C., the 0.5 percent sodium resin sulfonate solution had a viscosity at 25° C. of 35,000 centipoises.

*Example 3*

Into a solution of 15.6 ccs. chlorosulfonic acid and 300 ccs. liquid sulfur dioxide at −10° C. was slowly added a dispersion of 25 grams polymer B, hereinbefore identified, in 200 ccs. liquid sulfur dioxide, the polymer dispersion being added slowly over a period of about 5 minutes with very vigorous agitation. Agitation was continued for 45 minutes after the reactants were admixed. The resulting slurry was filtered, the solid resin sulfonic acid was washed with ether and dried under vacuum.

The viscosity at 25° C. of a water solution of 0.5 percent by weight of the neutral sodium salt of the resin sulfonate was 21,000 centipoises. After 20 hours at 90° C., the 0.5 percent sodium resin sulfonate solution had a viscosity at 25° C. of 18,000 centipoises.

*Example 4*

Into a solution of 15.6 ccs. chlorosulfonic acid and 500 ccs. liquid sulfur dioxide at −10° C. was slowly sprinkled 25 grams of the pulverulent polymer C, hereinbefore described. The polymer powder was added over a period of about 4 minutes, with very vigorous agitation of the reaction mixture, after which the agitation was continued for 30 minutes. The resulting slurry was filtered, the solid resin sulfonic acid was washed with diethyl ether and dried under vacuum.

The viscosity at 25° C. of a water solution containing 0.5 percent by weight of the neutral sodium salt of the polymer sulfonic acid was 16,000 centipoises. After 23 hours at 90° C., the 0.5 percent sodium polymer sulfonate solution had a viscosity at 25° C. of 16,000 centipoises.

*Example 5*

Into a solution of 16 ccs. chlorosulfonic acid and 300 ccs. liquid sulfur dioxide at −10° C. was slowly added a dispersion of 25 grams of polymer D, hereinbefore described, in 200 ccs. liquid sulfur dioxide, the polymer dispersion being added slowly, over a period of 5 minutes, with very vigorous agitation of the reaction mixture. Stirring was continued for one-half hour after complete addition of the polymer starting material. The resulting slurry was filtered and the solid polymer sulfonic acid was washed with ether and dried in vacuum.

A one-gram portion of the ether-extracted dry polymer sulfonic acid was dissolved in water and required 4.1 ccs. of 1.0 N sodium hydroxide solution to effect neutralization. A 0.5 percent by weight solution of the neutral sodium resin sulfonate in cold water had an apparent initial viscosity of 3800 centipoises at 25° C. Brief heating of this solution greatly increased the viscosity, probably by providing a more complete distribution of the sodium resin sulfonate in the solution, and after 15.5 hours at 90° C., the viscosity of the same solution at 25° C. was 7000 centipoises.

*Example 6*

A copolymer of 95 percent by weight ar-vinyltoluene and 5 percent acrylonitrile, a solution of a portion of which in nine times its weight of toluene had a viscosity of 345.7 centipoises at 25° C., was sulfonated by a procedure similar to those of the previous examples, using chlorosulfonic acid as the sulfonation agent and liquid sulfur dioxide as the sulfonation medium. Portions of the ether-purified, vacuum dried resin sulfonic acid were dissolved in water and made up as solutions of differing concentrations of the resin sulfonic acid. Other portions of the resin sulfonic acid were dissolved in water, neutralized with sodium hydroxide and made up as solutions of differing concentrations of the sodium resin sulfonate. The viscosities of the resulting solutions were then measured at a temperature of 25° C. These data are shown in the table below:

| Concentration of Sulfonate, Percent by Weight | Viscosity, Centipoises, at 25° C. ||
|---|---|---|
| | Resin Sulfonic Acid | Sodium Resin Sulfonate |
| 0.1 | 550 | 170 |
| 0.25 | 25,000 | 10,000 |
| 0.4 | 51,000 | 30,000 |
| 0.5 | 60,000 | 48,000 |
| 0.6 | over 100,000 | 70,000 |
| 0.75 | | over 100,000 |

I claim:

1. A method for the preparation of resin sulfonates that are capable of being only highly swollen by aqueous liquids to form aqueous compositions possessing substantially stable viscosities greater than those of the aqueous liquid ingredients of the compositions, which method comprises reacting together by admixing slowly and with vigorous agitation, in the presence of liquid sulfur dioxide as a reaction medium and at a reaction temperature between −40° and +10° C., chlorosulfonic acid and a polymer of a monovinylaromatic hydrocarbon of the benzene series in amounts corresponding to at least 0.7 molecular proportion of chlorosulfonic acid for each molecular proportion of monomeric compound chemically combined in the polymer and an amount of liquid sulfur dioxide corresponding to at least 80 percent by weight of the whole reaction mixture, said polymer being substantially free of crosslinkages, and containing at least 60 percent by weight of at least one monovinylaromatic hydrocarbon of the benzene series chemically combined therein, the polymer being one whose solution in nine times its weight of toluene has a viscosity of at least 82.4 centipoises at a temperature of 25° C.

2. A method according to claim 1 wherein the reaction temperature is between −20° and +5° C.

3. A method according to claim 1 wherein the proportion of liquid sulfur dioxide corresponds to at least 90 percent by weight of the whole reaction mixture.

4. A method according to claim 3 wherein the reaction temperature is between −20° and +5° C.

5. A method according to claim 4 wherein the polymer is in the form of fine dry solid particles having average diameters not greater than about 10 microns and aggregates of such particles, which aggregates have diameters not greater than about 15 microns.

6. A method according to claim 5 wherein the polymer is polymerized styrene.

7. A method according to claim 5 wherein the polymer is polymerized ar-vinyltoluene.

8. A method according to claim 4 wherein the polymer is a copolymer of from 85 to 98 percent by weight of at least one monovinylaromatic hydrocarbon of the benzene series and from 15 to 2 percent by weight of acrylonitrile, the copolymer being dispersed in at least a portion of the liquid sulfur dioxide reaction medium and the resulting dispersion being admixed with the chlorosulfonic acid.

9. A method according to claim 8 wherein the copolymer consists of from 85 to 98 percent by weight styrene and from 15 to 2 percent by weight acrylonitrile.

10. A method according to claim 8 wherein the copolymer consists of from 85 to 98 percent by weight ar-vinyltoluene and from 15 to 2 percent by weight acrylonitrile.

References Cited in the file of this patent

UNITED STATES PATENTS

| 2,645,621 | D'Alelio | July 14, 1953 |
| 2,691,644 | Roth | Oct. 12, 1954 |